United States Patent [19]

Ishizeki

[11] Patent Number: 4,935,873
[45] Date of Patent: Jun. 19, 1990

[54] METHOD FOR CHECKING OPERATION OF ANTI-SKID SYSTEM OF MOTOR VEHICLES

[75] Inventor: Seiichi Ishizeki, Ashikaga, Japan

[73] Assignee: Fuji Jukogyo Kabushiki Kaisha, Tokyo, Japan

[21] Appl. No.: 238,477

[22] Filed: Aug. 31, 1988

[30] Foreign Application Priority Data

Sep. 4, 1987 [JP] Japan .................. 62-221781
Sep. 7, 1987 [JP] Japan .................. 62-223549

[51] Int. Cl.$^5$ ........................... B60T 17/18
[52] U.S. Cl. ............... 364/426.02; 364/551.01
[58] Field of Search .......... 364/426.01, 426.02, 364/424.01, 551.01, 558; 303/92, 95, 100

[56] References Cited

U.S. PATENT DOCUMENTS

| | | | |
|---|---|---|---|
| 4,340,935 | 7/1982 | Anlauf et al. | 364/426.01 |
| 4,389,710 | 6/1983 | Rasmussen | 364/551 |
| 4,520,444 | 5/1985 | Koos | 364/426.01 |
| 4,567,757 | 2/1986 | Melocik et al. | 73/129 |
| 4,627,011 | 12/1986 | Spencer et al. | 364/566 |
| 4,741,580 | 5/1988 | Matsubara et al. | 303/105 |
| 4,750,126 | 6/1988 | Bleckmann et al. | 364/426.02 |
| 4,771,387 | 9/1988 | Hexel et al. | 364/426.02 |

FOREIGN PATENT DOCUMENTS 59-184052 10/1984 Japan .
61-36008 2/1986 Japan .

Primary Examiner—Thomas G. Black
Attorney, Agent, or Firm—Beveridge, DeGrandi & Weilacher

[57] ABSTRACT

For checking the operation of an anti-skid system of a motor vehicle, each wheel of the vehicle is placed on rollers of a brake tester. When a brake pedal is depressed to deliver via a brake pedal switch a signal having a predetermiend signal pattern to a control unit, a pseudo signal generating circuit provided in the control unit generates and sends to an actuator for a brake device a pressure reducing signal and a pressure-holding-and-increasing signal combined in a predetermined sequence whereby the brake device is actuated. Whether or not a normal anti-skid control is carried out is confirmed by measuring with the brake tester the braking force actually applied to each wheel in response to the signals delivered from the pseudo signal generating circuit.

8 Claims, 3 Drawing Sheets

# METHOD FOR CHECKING OPERATION OF ANTI-SKID SYSTEM OF MOTOR VEHICLES

BACKGROUND OF THE INVENTION

1. Technical Field

The present invention relates to a method for checking the operation of anti-skid system incorporated in motor vehicles.

2. Prior Art

It is known that the anti-skid brake system of motor vehicles operates in response to the lowest wheel peripheral speed among a plurality of wheels for controlling the brake force so as to prevent skid against the road surface.

Japanese Laid-Open Patent Application (Kokai) No. 59-184052, published Oct. 19, 1984, discloses a method for checking the anti-skid brake system comprising the steps of electing one pseudo wheel-speed signal among pseudo wheel-signals in accordance with each operating condition produced in a pseudo signal generator while the vehicle is stopped, inputting the pseudo wheel-speed signal to the anti-skid brake system, and confirming the oscillation of the hydraulic pressure in the anti-skid brake system responsive to the pseudo wheel-speed signal, that is interrupting anti-skid control during the normal decelerating condition or always in response to the lowest wheel peripheral speed among a plurality of wheels.

Furthermore, there has been also devised and disclosed in Japanese Laid-Open Patent Application (Kokai) No. 61-36008 published Feb. 20, 1986 a method for a self-diagnosing system of electronic devices mounted on motor vehicles, comprising the steps of providing a self-diagnosis start switching means at a position at which the driver can operate it and further providing self-diagnosis-start control means for starting the self-diagnosis when the switching signals are delivered from the self-diagnosis start switching means in excess of a predetermined number within a predetermined time period, whereby the starting of the self-diagnosis can be commanded directly from the driver's seat and an erroneous operation can be prevented when a vehicle is in the normal running mode.

In the method for detecting the oscillation of the hydraulic pressure produced in a wheel cylinder in the case of the inspection of the anti-skid brake action as is disclosed in the first-mentioned application (Japanese Laid-Open Patent Application No. 59-184052), it is of course needed to additionally provide a sensor for detecting the oscillation of the hydraulic pressure in each wheel cylinder. In addition, in the case where an anti-skid brake-action sensing device is fabricated as a unitary construction so that it can be detached from the vehicle body to be carried freely, a confirmation lamp included in the anti-skid brake-action diagnosis device must be connected through connecting terminals to the hydraulic-pressure-oscillation sensor incorporated in the wheel cylinder.

In the case of the second mentioned prior art method (Japanese Laid-Open Patent Application No. 61-36008), only the self-diagnosis for detecting whether or not the correct arithmetic operations are executed by an electronic control device is effected, and it is impossible to detect whether or not the actual operation of a mechanism activated in response to the results of the arithmetic operations executed by the electronic control device is correct.

SUMMARY OF THE INVENTION

The present invention is based on the fact that motor vehicles with or without anti-skid systems are subjected to the brake action test on a brake tester whenever they leave the production line and provides a method for checking the anti-skid brake action without the provision of hydraulic-pressure-oscillation sensor on the wheel cylinders and without the use of switching means or the like for starting the check procedure.

According to the present invention, in motor vehicles equipped with an anti-skid brake system of the type employing a control method comprising the steps of reducing hydraulic pressure applied to a brake device in response to a signal from a control unit when the deceleration rate or deceleration of the speed of each wheel with respect to the vehicle body speed has become a predetermined value as a result of transmission of the hydraulic pressure to the brake device due to a braking action, increasing the hydraulic pressure applied to the brake device upon a recovery of the speed of each wheel, and repeating such pressure reduction and increase, the method for checking the operation of the anti-skid system comprising the step of incorporating into the control unit a pseudo signal generating means for generating a pressure reducing signal and a pressure holding-and-increasing signal combined in a predetermined sequence when the pattern of a signal delivered from a brake pedal switch to the control unit in response to depression of a brake pedal is in coincidence with a predetermined signal pattern previously stored in the control unit, and the step of confirming whether or not a normal anti-skid control is carried out by measuring with a brake tester, the braking force applied to each wheel in response to the pressure reducing signal and the pressure holding-and-increasing signal delivered from the pseudo signal generator.

By the above-described method, it becomes possible to detect malfunction or failure of a brake fluid pressure control device inserted in a brake-fluid-line system and erroneous arrangements and connections of pipe or line systems and electrical wiring.

DESCRIPTION OF THE PREFERRED EMBODIMENTS

Figure 1:
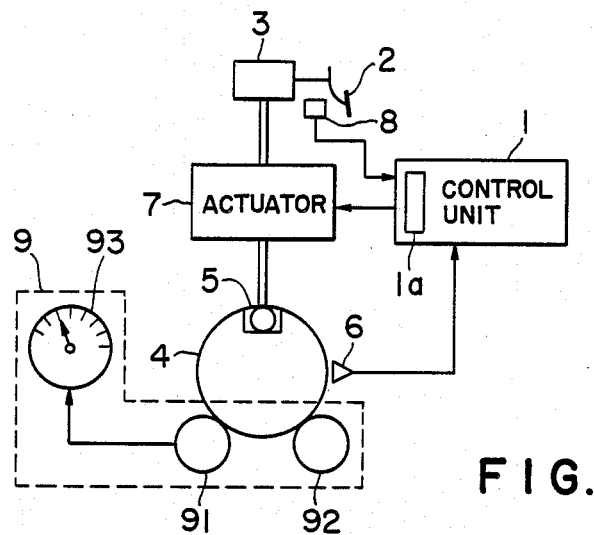
FIG. 1 shows an apparatus best adapted for carrying out a method in accordance with the present invention.

Referring now to FIG. 1, a preferred embodiment of the present invention will be described. First, the mode of operation of a control circuit or unit 1 in an anti-skid system equipped in a motor vehicle will be briefly described. When a brake pedal 2 is depressed, a master cylinder 3 is activated so that the brake liquid under pressure is applied from the master cylinder 3 to a brake device 5 for each wheel 4 (Only one wheel is shown) and therefore brake action takes place to cause the wheel speed to become lower than the vehicle body speed. In this case, when the rate of slowing-down or deceleration of the wheel speed detected by a wheel-speed sensor 6 becomes a predetermined value, the control circuit 1 actuates a pressure applying valve (not shown) of an actuator 7 in a brake liquid line to generate a hold signal in response to which the hydraulic pressure in the brake device 5 is maintained at a brake-application level. However, when the wheel speed further drops to a lower speed even when the actuator 7 is activated as described above, the control circuit 1 actuates a pressure reducing valve (not shown) of the actuator 7 to generate a pressure reducing signal in response to which the hydraulic pressure in the brake device 5 is reduced so that the braking force is decreased. As a result, the deceleration rate of the wheel speed is lowered and when it becomes a minimum value, the pressure reducing signal is interrupted to maintain braking action. Thereafter when the wheel speed increases due to the reaction forces from the road surface and the wheel speed becomes almost equal to the vehicle body speed, the pressure applying valve of the actuator 7 is actuated to generate a pressure signal for increasing stepwise the hydraulic pressure in the brake device 5. When the pressure applied to the brake device 5 is repeatedly increased and reduced in the manner described above, a brake-liquid-pressure control command for attaining an optimum vehicle body deceleration in accordance with a control pattern is generated. The mode of anti-skid operation described above is well known in the art so that no further detailed description will be made in this specification.

Figure 3:
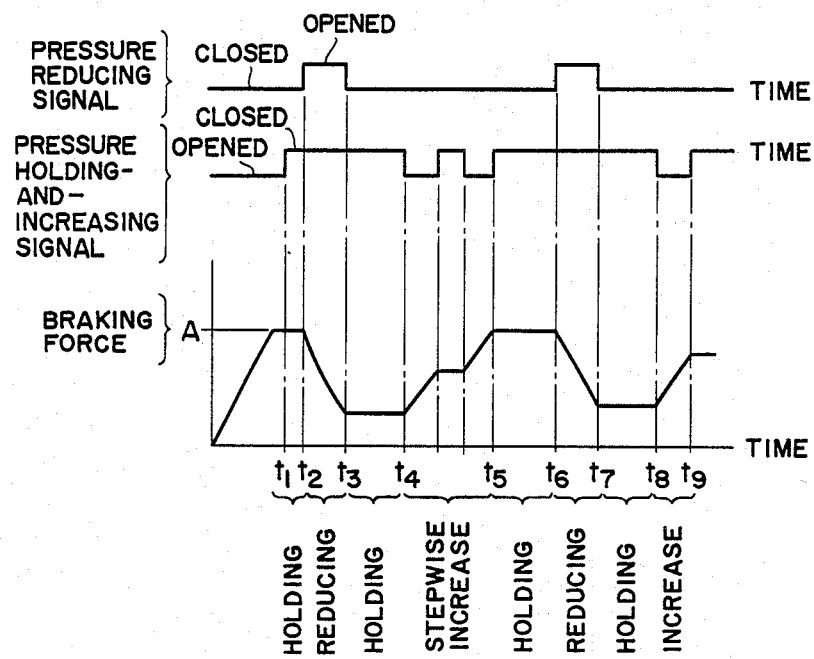
FIG. 3 is a time chart illustrating a pressure reducing signal and a pressure-holding-and-increasing signal and variations in braking force in response thereto.

The anti-skid control unit 1 of the type described above has a self-diagnosis function for checking failures of various component parts and electric circuits such as disconnected wires, short-circuits, etc. in the anti-skid system. The self-diagnosis function is also well known in the art so that no further detailed description thereof will be made herein. When a wire disconnection or a short-circuit occurs, the coil of a fail-safe relay (not shown) is de-energized, thereby turning off a power supply circuit for the actuator 7. Then, the anti-skid control is interrupted so that the brake system is brought into a mode (normal brake application mode) in which the hydraulic pressure is applied from the master cylinder 3 directly to the brake device 5 of each wheel 4, and consequently the erroneous operation of the anti-skid control due to a disconnection of a wire or a short-circuit can be prevented. However, it is impossible to detect failure of the mechanical function (such as the effective control of the braking force) due to malfunction of the pressure applying and reducing valves of the actuator 7 which controls the brake liquid pressure and due to erroneous arrangements and connections of the electrical wiring and hydraulic pressure lines. In view of the above problems, the present invention has features to be described below. As shown in FIG. 1, incorporated in the control unit 1 is a pseudo signal generator 1a for generating an anti-skid-check-mode actuating signal consisting of a pressure reducing signal, and a pressure holding-and-increasing signal combined in a sequence as shown in FIG. 3. The anti-skid-check-mode actuating signal is generated when the pattern of a signal generated from a brake pedal switch 8 by depression of the brake pedal 2 is in coincidence with the pattern of a check operation command previously stored in the circuit of the control unit 1. The braking forces applied to the wheels 4 due to the actuation of the actuator 7 in response to the anti-skid-check-mode actuating signal from the pseudo signal generator 1a are detected by a brake tester 9, which comprises double rollers 91 and 92 that support the wheel 4 and are driven by a power source (not shown) and a dynamometer 93 that displays the braking force applied to the wheel in response to the reaction forces produced by the double rollers 91 and 92 when the brake is applied, whereby whether or not the normal anti-skid control is carried out is detected.

Figure 2:
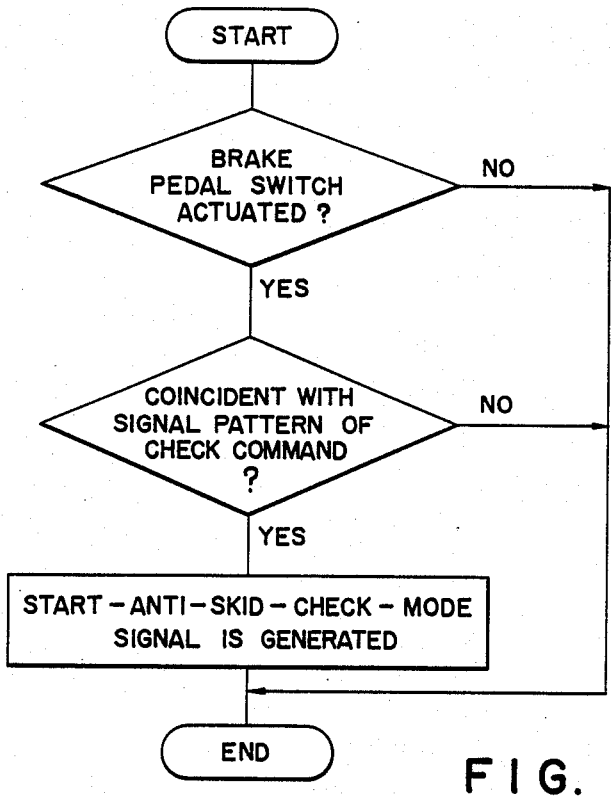
FIG. 2 is a flowchart illustrating a method for confirming the signal pattern of a check command.

More particularly, as shown in FIG. 1, the wheel 4 is placed on the double rollers 91 and 92 of the brake tester 9 in order to measure the braking force applied to the wheel 4 and the double rollers 91 and 92 are driven by the power source. Thereafter, the brake pedal 2 is depressed lightly several times in order to generate a signal having a certain predetermined signal pattern and then it is depressed in such a way that the braking force displayed on the dynamometer 93 of the brake tester 9 will be maintained at a predetermined value A (for instance, 100 Kg) as shown in FIG. 3. As a result, the pseudo signal generator 1a detects the signal pattern delivered from the brake pedal switch 8 which is in coincidence with the predetermined signal pattern (for instance, consisting of five succeeding pulse signals) previously stored in the circuit of the control unit 1 and generates the anti-skid-check-mode actuating signal in accordance with the procedure flowchart shown in FIG. 2.

In response to the anti-skid-check-mode actuating signal consisting of the pressure reducing signal and the pressure holding-and-increasing signal combined according to the sequence shown in FIG. 3, the actuator 7 activates the pressure reducing valve and the pressure holding-and-increasing valve (pressure applying valve) in the manner to be described below. A pattern of variations in brake liquid pressure in response to the opening and closing operations of these valves is shown in FIG. 3, which is a time chart illustrating variations of the braking force. During the periods from t1 to t2, from t3 to t4, from t5 to t6, from t7 to t8 and from t9 onward as plotted along the abscissa (the time axis), the brake liquid pressure is held or remains unchanged. During the period from t4 to t5, the pressure is increased stepwise; during the period from t8 to t9, the pressure is increased; and during the periods from t2 to t3 and from t6 to t7, the pressure is decreased. In response to whether the brake liquid pressure is in the hold state, the reduction state or the increase state, the braking force measured by the dynamometer 93 of the brake tester 9 remains at a predetermined level, drops or rises, respectively. When the braking forces measured by the dynamometer 93 are substantially equal to reference values indicated in FIG. 3 at the respective time points t1–t9, it is then confirmed that the pressure reducing valve and the pressure holding-and-increasing valve of the actuator 7 for controlling the brake liquid pressure applied to the brake 5 of the wheel 4 placed on the double rollers 91 and 92 have proper functions as well as a predetermined degree of pressure reducing capability and a predetermined degree of pressure increasing capability, respectively, and that there exists no failure in the arrangements of the pipe lines and the electric wiring.

By repeating the procedure described above, it is possible to inspect the malfunction or failure of various valves of the actuator 7 inserted into each of the brake liquid pressure lines extending to the brake devices 5 of the wheels 4 as well as the erroneous arrangements of pipe lines and electric wiring. It is possible to successively inspect both the right and left wheels with a predetermined time difference during the generation of the same anti-skid-check-mode actuating signal.

In the above embodiment of the invention, the predetermined signal pattern stored in the control unit 1 has been described as consisting of, for instance, five succeeding pulse signals. However, when a simple signal pattern is used, there is a possibility that the signal pattern delivered from the brake pedal switch 8 happens to coincide with the above described the anti-skid-check-mode actuating signal pattern as a sequence control mode during the normal brake action. It will be understood that in this case there exists a fear of the sequence control mode for diagnosing the mechanical functions being carried out against the intention of the driver.

Figure 5:
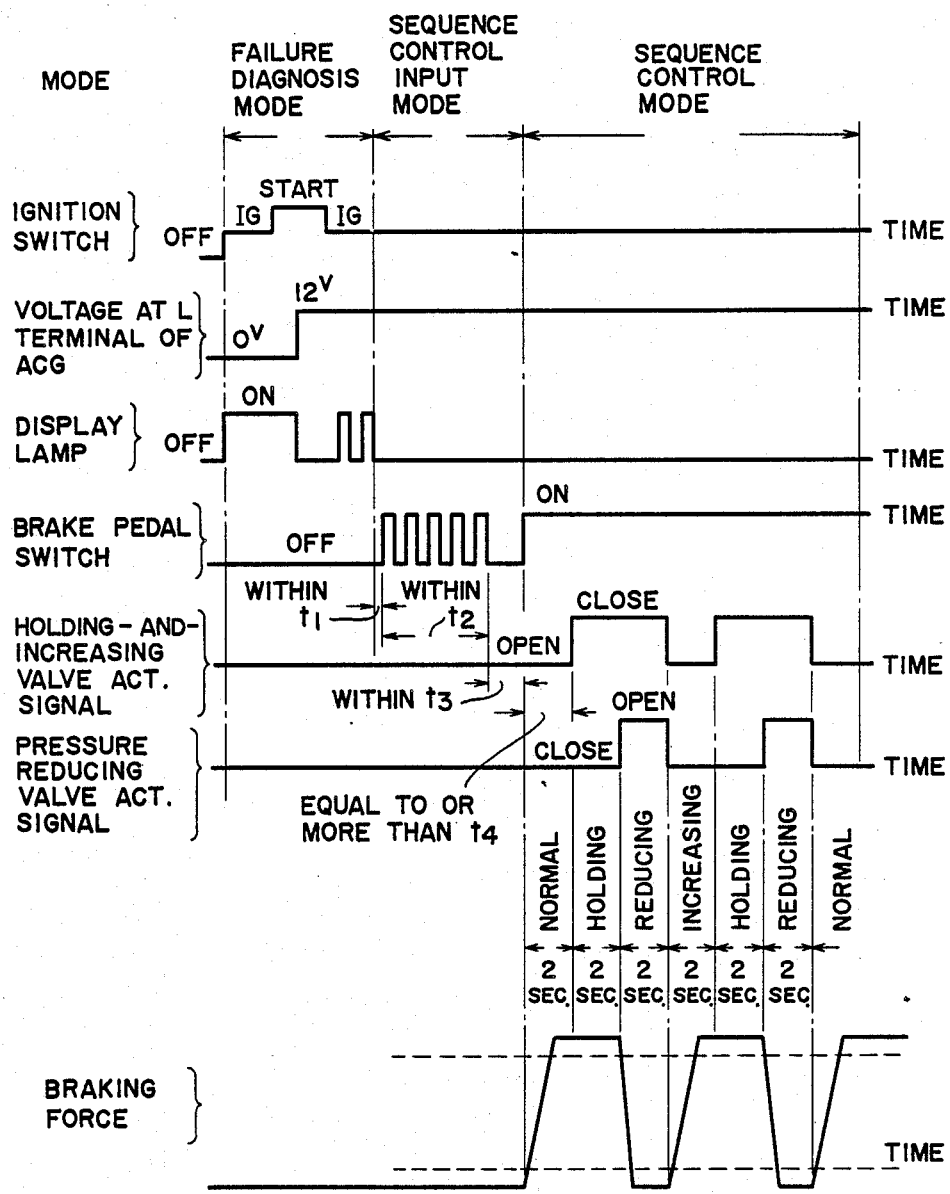
FIG. 5 is a time chart illustrating various operations carried out in a failure diagnosis mode, a sequence control input mode and a sequence control mode.

In an embodiment of the invention to be described below, the input condition for selecting the sequence control mode for diagnosis of mechanical functions is met only when the following two conditions as indicated in FIG. 5 are satisfied:

(1) The first condition wherein the wheel speed is lower than a predetermined speed (for instance, 5 Km/h); and (2) The second signal timing condition wherein (a) the time period from the time when the input start signal is generated to the time when a signal train (for instance, consisting of five repetitive pulse signals) is delivered from the brake pedal switch 8 in response to the depression of the brake pedal 2 is within a first predetermined time interval $t_1$ (for instance, three seconds); (b) a time period required for the brake pedal switch 8 to finish to generate the above-mentioned signal train is within a second predetermined time interval $t_2$ (for instance, five seconds); (c) a rest time period from the time when the signal train is terminated to the time when the signal is generated by the brake pedal switch 8 in response to re-depression of the brake pedal 2 is within a third predetermined time interval $t_3$ (for instance, three seconds); and (d) the length of time of the signal generated by the brake pedal switch 8 in response to the above-mentioned re-depression of the brake pedal 2 is equal to or longer than a predetermined time interval $t_4$ (for instance, four seconds).

Figure 4:
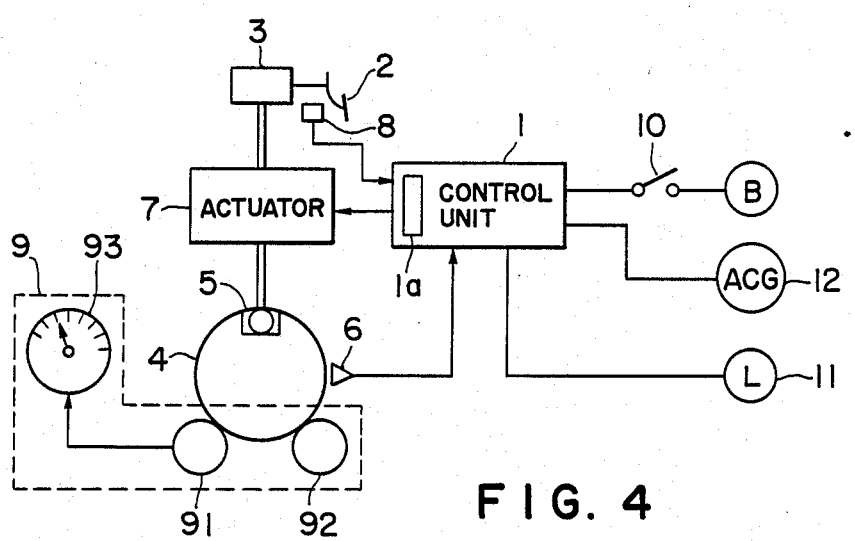
FIG. 4 shows a further apparatus best adapted to carry out another method in accordance with the present invention.

More particularly, as shown in FIG. 4, the wheel 4 is placed on the double rollers 91 and 92 of the brake tester 9 in order to measure the braking force applied to the wheel 4 and the double rollers 91 and 92 are driven by a power source (not shown). Next, as shown in FIG. 5, after an ignition switch 10 is switched to the IGNITION terminal and also after the confirmation that a display lamp 11 is turned on, the ignition switch 10 is switched to the START terminal, thereby starting an engine (not shown). Then the voltage at the L terminal of an AC generator 12 rises and the display lamp 11 is turned off. Thereafter, the failure diagnosis of the control unit 1 is carried out and when the control unit 1 is found to have no failure, the display lamps 11 are turned on twice and the failure diagnosis mode is completed.

Then, the sequence control mode follows. As shown in FIG. 5, the brake pedal 2 is depressed within the first predetermined time interval $t_1$ (for instance, three seconds) after the display lamp 11 is turned off and the depression of the brake pedal 2 is repeated predetermined times (for instance, five times) within the second predetermined time interval $t_2$ (for instance, five seconds) after the depression of the brake pedal 2. Thereafter, the brake pedal 2 is depressed again within the third predetermined time interval $t_3$ (for instance, three seconds) after a predetermined number of depression of the brake pedal 2 and the re-depression of the brake pedal 2 is continued longer than the fourth predetermined time interval $t_4$ (for instance, four seconds). When the wheel speed indicated by the wheel speed signal from the wheel speed sensor 6 is lower than a predetermined speed (for instance, 5 Km/h), the sequence control mode for self-diagnosis of the mechanical system is carried out.

In the sequence control mode, the braking force applied to each wheel 4 by the actuation of the actuator 7 in response to the pressure-holding-and-increasing-valve actuating signal and the pressure-reducing-valve actuating signal combined in a predetermined sequence, as shown in FIG. 5, delivered from the pseudo signal generator 1a of the control unit 1 is measured by the brake tester 9 comprising the double rollers 91 and 92 and the dynamometer 93 for displaying the braking force applied to the wheel 4 based on the reaction forces. As a result, it can be confirmed that not only the pressure holding-and-increasing valve and the pressure reducing valve in the actuator 7 have no failure at all but also the pipe or tube line system as well as the electrical wiring system are not erroneously arranged.

As described above, according to the present invention, it is possible to detect not only the failures of the pressure reducing valve and the pressure applying valve in the actuator inserted into the brake line pressure line system for distributing the hydraulic braking pressure to each wheel but also erroneous arrangements and connections of liquid pipes or lines and electrical wiring, so that it is not needed to attach additional hydraulic pressure detection means to the brakes such as wheel cylinders and switching means for starting the diagnosis. In addition, when the signal pattern is determined in the manner described above, the erroneous switching into the mode of diagnosing the mechanical system can be prevented.

What is claimed is:

1. A method for checking the operation of an anti-skid system for a brake device in a motor vehicle, including a brake pedal, a brake pedal switch for producing a brake signal, an actuator for controlling braking forces applied by said brake device, and a control unit for controlling said actuator, comprising the steps of:

determining when a pattern of said brake signal delivered from said brake pedal switch to said control unit in response to depression of said brake pedal coincides with a predetermined signal pattern previously stored in said control unit;

generating a pressure reducing signal and a pressure holding-and-increasing signal combined in a predetermined sequence of reference values representing predetermined braking forces;

delivering said pressure reducing signal and said pressure holding-and-increasing signal to said actuator for reducing or increasing braking forces applied by said brake device;

measuring said braking forces applied to each wheel in response to said pressure reducing signal and said pressure holding-and-increasing signal;

comparing said braking forces and said reference values to confirm that said braking forces are approximately equal to said reference values.

2. A method for checking the operation of an anti-skid system as set forth in claim 1, wherein said predetermined signal pattern is defined by a wheel speed condition in which the wheel speed is lower than a predetermined speed, and a signal timing condition in which a time period from the time when an input-start signal is generated to the time when a signal train is generated by the brake pedal switch in response to a depression of the brake pedal, is within a first predetermined time interval, and a time period required for the brake pedal switch to finish to generate the signal train is within a second predetermined time interval, and in which a rest time interval from the time when said signal train is terminated to the time when a signal is generated by said brake pedal switch in response to a re-depression of said brake pedal is within a third predetermined time interval, and the length of time of continuous re-depression of said brake pedal is equal to or longer than a fourth predetermined time interval.

3. A method for checking the operation of an anti-skid system as set forth in claim 2, wherein said first, second and third time intervals are different from each other.

4. A method for checking the operation of an anti-skid system as set forth in claim 3, wherein said fourth time interval is different from any one of said first, second and third intervals.

5. A method for checking the operation of an anti-skid system having an actuator to control hydraulic pressure in a brake device mounted on a motor vehicle and a brake pedal switch provided to produce brake signals, the method comprising the steps of:
  detecting a signal train representing a check operation starting command in response to a plurality of the brake signals;
  comparing the signal train with a predetermined signal pattern;
  supplying pseudo signals to reduce and increase the hydraulic pressure in a predetermined sequence to the actuator when the signal train coincides with the predetermined signal pattern;
  reducing the hydraulic pressure in response to the pseudo signals;
  increasing the hydraulic pressure in response to the pseudo signals;
  repeating the steps of reducing and increasing hydraulic pressure;
  measuring a variation of an actual braking force applied to each wheel in response to the pseudo signals on a brake tester;
  comparing the variation of the actual braking force with a predetermined force pattern dependent on the pseudo signals; and
  confirming that a normal anti-skid control is carried out when the variation of the actual braking force coincides with the redetermined force pattern.

6. A method for checking the operation of an anti-skid system as set forth in claim 5, wherein said predetermined signal pattern is defined by a wheel speed condition in which the wheel speed is lower than a predetermined speed, and a signal timing condition in which a time period from the time when an input-start signal is generated to the time when said signal train is generated by the brake pedal switch in response to a depression of a brake pedal, is within a first predetermined time interval, and a time period required for the brake pedal switch to finish to generate the signal train is within a second predetermined time interval, and in which a rest time interval from the time when said signal train is terminated to the time when a signal is generated by said brake pedal switch in response to a re-depression of said brake pedal is within a third predetermined time interval, and the length of time continuous re-depression of said brake pedal is equal to or longer than a fourth predetermined time interval.

7. A method for checking the operation of an anti-skid system as set forth in claim 6, wherein said first, second and third time intervals are different from each other.

8. A method for checking the operation of an anti-skid system as set forth in claim 7, wherein said fourth time interval is different from any one of said first, second and third intervals.

* * * * *